United States Patent
Park et al.

(10) Patent No.: US 8,867,014 B2
(45) Date of Patent: Oct. 21, 2014

(54) METHOD OF FABRICATING A LIQUID CRYSTAL DISPLAY DEVICE COMPRISING A REFLECTOR THAT INCLUDES A PROTECTION SHEET THAT HAS A RECTANGULAR SHAPE AND A PROTRUDING PART WHEREIN THE PROTECTION SHEET IS DETACHED USING THE PROTRUDING PART

(71) Applicant: LG Display Co., Ltd., Seoul (KR)

(72) Inventors: Jae-Sung Park, Gumi-si (KR); Jung-Hun Lee, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/945,574

(22) Filed: Jul. 18, 2013

(65) Prior Publication Data

US 2013/0300976 A1    Nov. 14, 2013

Related U.S. Application Data

(62) Division of application No. 12/588,299, filed on Oct. 9, 2009, now Pat. No. 8,542,332.

(30) Foreign Application Priority Data

May 8, 2009   (KR) .......................... 10-2009-0040336

(51) Int. Cl.
| | |
|---|---|
| G02F 1/13 | (2006.01) |
| G02F 1/1335 | (2006.01) |
| G09F 13/04 | (2006.01) |
| G02F 1/1333 | (2006.01) |
| F21V 8/00 | (2006.01) |

(52) U.S. Cl.
CPC .... *G02F 1/133608* (2013.01); *G02F 1/133308* (2013.01); *G02B 6/0081* (2013.01); *G02F 2202/28* (2013.01); *G02F 2001/13332* (2013.01); *G02F 2201/50* (2013.01); *G02F 2001/133314* (2013.01)
USPC .............................. 349/187; 349/67; 362/97.2

(58) Field of Classification Search
USPC .............................. 349/61–67; 362/97.1–97.4
See application file for complete search history.

(56) References Cited

U.S. PATENT DOCUMENTS

| | | | |
|---|---|---|---|
| 2007/0024771 A1 | 2/2007 | Shinohara et al. | |
| 2008/0106674 A1 | 5/2008 | Hsiao | |
| 2009/0153766 A1 | 6/2009 | Lee et al. | |

FOREIGN PATENT DOCUMENTS

| | | | |
|---|---|---|---|
| JP | 2006145918 A | * | 6/2006 |
| JP | 2009-003245 A | | 1/2009 |
| KR | 10-2007-0014064 A | | 1/2007 |

* cited by examiner

*Primary Examiner* — Paul Lee
(74) *Attorney, Agent, or Firm* — McKenna Long & Aldridge LLP

(57) ABSTRACT

A liquid crystal display device includes a liquid crystal panel; a main frame surrounding sides of the liquid crystal panel; a backlight unit disposed under the liquid crystal panel and surrounded by the main frame, the backlight unit including a light guide plate, a lamp at a side of the light guide plate, a reflector under the light guide plate and an optical sheet on the light guide plate, wherein a rear surface of the reflector is exposed through an opening of the main frame; and a protection sheet attached to the rear surface of the reflector to protect the rear surface of the reflector and including a protruding part at a side of the protection sheet, the protection sheet has a rectangular shape.

5 Claims, 5 Drawing Sheets

METHOD OF FABRICATING A LIQUID CRYSTAL DISPLAY DEVICE COMPRISING A REFLECTOR THAT INCLUDES A PROTECTION SHEET THAT HAS A RECTANGULAR SHAPE AND A PROTRUDING PART WHEREIN THE PROTECTION SHEET IS DETACHED USING THE PROTRUDING PART

The present application is a divisional application of U.S. application Ser. No. 12/588,299, filed Oct. 9, 2009 (allowed), and claims the benefit of Korean Patent Application No. 10-2009-0040336 filed in Korea on May 8, 2009, which are hereby incorporated by reference for all purposes as if fully set forth herein.

BACKGROUND OF THE INVENTION

1. Field of the Invention

The present invention relates to a liquid crystal display (LCD) device and more particularly to an LCD device having a thin profile and a light weight and a method of fabricating an LCD device module including the LCD device.

2. Discussion of the Related Art

Flat panel display devices, such as, liquid crystal display (LCD) devices, plasma display panels (PDPs), electroluminescent display (ELD) devices and field emission display (FED) devices, are widely used instead of a cathode ray tube (CRT) because of their advantages of a thin profile, a light weight, and a high efficiency.

Among these devices, the LCD devices are most widely used for a notebook computer, a monitor and a television because of their high contrast ratio and characteristics adequate to display moving images.

Generally, an additional light source is required because the LCD panel is a non-emissive-type display device. Accordingly, a backlight unit is disposed under the LCD panel. The LCD device displays images using light produced by the backlight unit and supplied to the LCD panel.

FIG. 1 is a schematic exploded perspective view of the related art LCD device. In FIG. 1, the LCD device includes a liquid crystal panel 10, a backlight unit 20, a main frame 30, a top frame 40 and a bottom frame 50.

The liquid crystal panel 10 includes a first substrate 12, a second substrate 14 and a liquid crystal layer (not shown). The first and second substrates 12 and 14 face each other, and the liquid crystal layer is interposed therebetween. A printed circuit board (PCB) 17 is connected to one side of the liquid crystal panel 10 via a connection member 15.

The backlight unit 20 is disposed under the liquid crystal panel 10. The backlight unit 20 includes a lamp 24 as a light source, a reflector 22, a light guide plate 26 and an optical sheet 28. The lamp 24 is arranged along at least one side of the main frame 30. The reflector 22 is disposed on the bottom frame 50 and has a color of white or silver. The light guide plate 26 is disposed on the reflector 22, and the optical sheet 28 is disposed on or over the light guide plate 26.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

Light from the lamp 24 is illuminated onto the liquid crystal panel 10 through the light guide plate 26 and the optical sheet 28 such that the LCD can display images. The light is processed into a uniform plane light through the light guide plate 26 and the optical sheet 28.

Recently, the LCD device is used for not only a portable computer but also a monitor of a desktop computer and a wall-mounted television. Accordingly, the LCD device having a large displaying area and a light weight and a small volume is required. Unfortunately, since the LCD device includes too many elements, it is very difficult to meet the above requirements. For example, if the bottom frame is eliminated to meet the requirements, there may be damage to the reflector because the reflector is exposed.

SUMMARY OF THE INVENTION

Accordingly, the present invention is directed to a liquid crystal display device and method of fabricating liquid crystal display device module including the same that substantially obviates one or more of the problems due to limitations and disadvantages of the related art.

An advantage of the present invention is to provide a LCD device having a light weight and a thin profile.

Another advantage of the present invention is to provide a LCD device being capable of efficiently protecting their elements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a liquid crystal panel; a main frame surrounding sides of the liquid crystal panel; a backlight unit disposed under the liquid crystal panel and surrounded by the main frame, the backlight unit including a light guide plate, a lamp at a side of the light guide plate, a reflector under the light guide plate and an optical sheet on the light guide plate, wherein a rear surface of the reflector is exposed through an opening of the main frame; and a protection sheet attached to the rear surface of the reflector to protect the rear surface of the reflector and including a protruding part at a side of the protection sheet, the protection sheet has a rectangular shape.

In another aspect, a method of fabricating a liquid crystal display device module includes forming a liquid crystal display device including: a liquid crystal panel; a main frame surrounding sides of the liquid crystal panel; a backlight unit disposed under the liquid crystal panel and surrounded by the main frame, the backlight unit including a light guide plate, a lamp at a side of the light guide plate, a reflector under the light guide plate and an optical sheet on the light guide plate, wherein a rear surface of the reflector is exposed through an opening of the main frame; and a protection sheet attached to the rear surface of the reflector to protect the rear surface of the reflector and including a protruding part at a side of the protection sheet, the protection sheet has a rectangular shape; detaching the protection sheet from the reflective sheet using the protruding part; and modulating the liquid crystal display device with a case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the preferred embodiments, examples of which are illustrated in the accompanying drawings.

Figure 2:
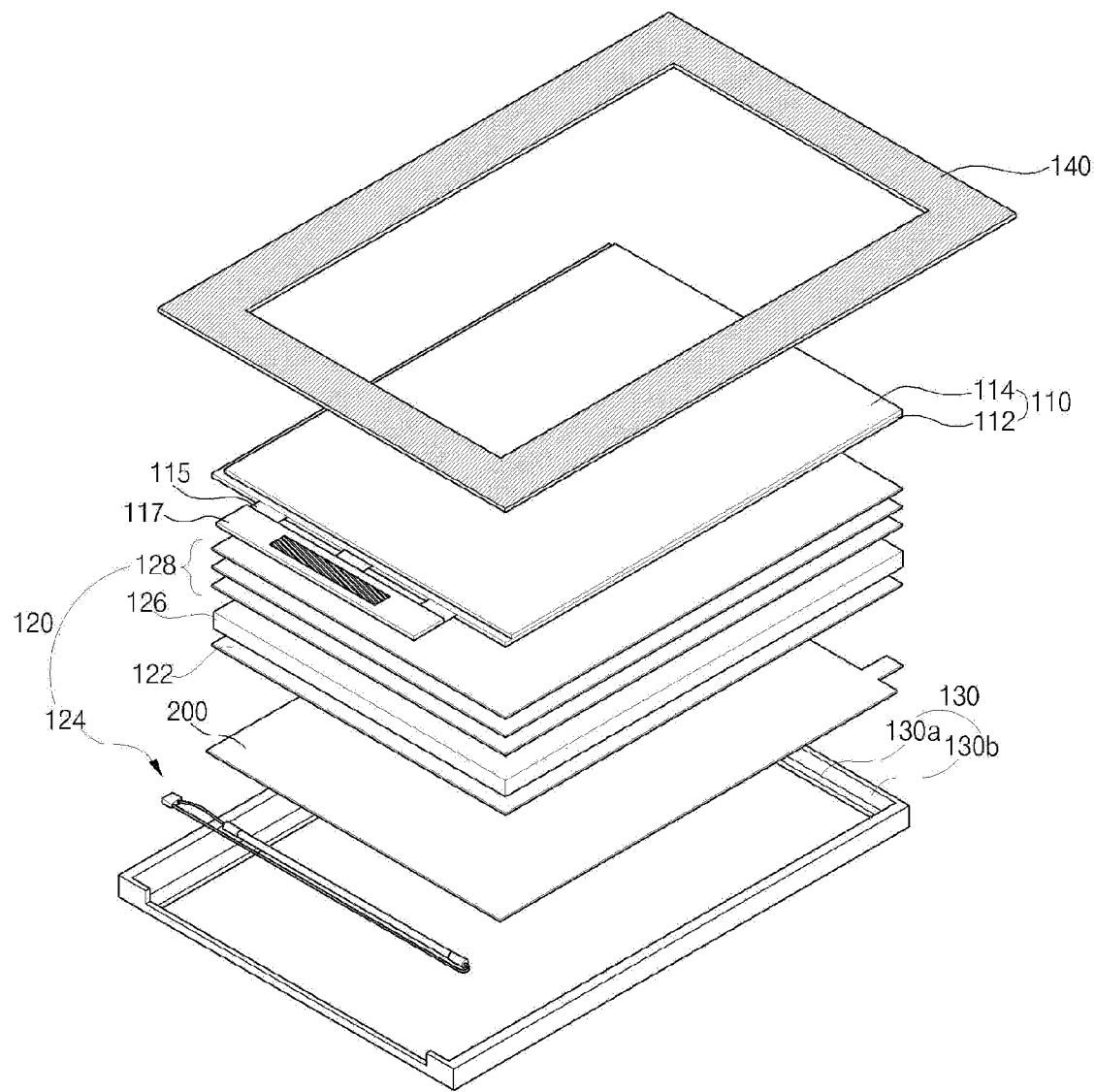
FIG. 2 is a schematic exploded perspective view of a LCD device according to the present invention.

FIG. 2 is a schematic exploded perspective view of a LCD device according to the present invention. In FIG. 2, an LCD device includes a liquid crystal panel 110, a backlight unit 120, a main frame 130 and adhesive tape 140.

The liquid crystal panel 110 includes a first substrate 112, a second substrate 114 and a liquid crystal layer (not shown). The first and second substrates 112 and 114 face each other, and the liquid crystal layer is interposed therebetween. Assuming the liquid crystal panel 110 is driven by an active matrix type, a gate line (not shown) and a data line (not shown) are formed on the first substrate 112. The gate and data lines cross each other to define a pixel. A thin film transistor (TFT) (not shown) is also formed on the first substrate 112 and positioned at a crossing portion of the gate and data lines. In addition, a pixel electrode (not shown) is positioned in each pixel and connected to the pixel electrode. The first substrate 112 may be called as an array substrate. On the other hand, red, green and blue color filters (not shown) are formed on the second substrate 114. In addition, a black matrix (not shown) for shielding the gate and data lines and the TFT and a common electrode for generating an electric field with the pixel electrode is formed on the second substrate 114. The second substrate 114 may be called a color filter substrate. A printed circuit board (PCB) 117 is connected to one side of the liquid crystal panel 110 via a connection member 115. The PCB 117 is bent along a side surface of the main frame 130 or a rear surface of the backlight unit 120 during a modulation process of the LCD device.

Although not shown, orientation layers for controlling an initial arrangement of liquid crystal molecules in the liquid crystal layer are formed on each of the first and second substrates 112 and 114 to face the liquid crystal layer. A seal pattern is formed along edges of the first and second substrates 112 and 114 to prevent leakage of the liquid crystal layer. A polarizing plate is formed on an outer surface of each of the first and second substrates 112 and 114.

The backlight unit 120 is disposed under the liquid crystal panel 110 such that light is illuminated onto the liquid crystal panel 110. The backlight unit 120 includes a lamp 124 as a light source, a reflector 122, a light guide plate 126 and an optical sheet 128. The lamp 124 is arranged along at least one side of the main frame 130. The reflector 122 is disposed under the light guide plate 126 and has a color of white or silver. The light guide plate 126 is disposed on the reflector 122, and the optical sheet 128 is disposed on or over the light guide plate 126. Although not shown, a light shielding tape may be formed between the liquid crystal panel 110 and the optical sheet 128 to prevent for the light from passing through a non-display region of the liquid crystal panel 110. In addition, a lamp guide for guiding the lamp 124 may be formed. A side of the lamp guide facing the light guide plate 126 is opened, and other portions of the lamp guide covering the lamp 124. The lamp guide protects the lamp 124, and light from the lamp 124 is concentrated to the light guide plate 126 due to the lamp guide. One of a cold cathode fluorescent lamp (CCFL), an external electrode fluorescent lamp, and an LED is used as a lamp 124. The lamp guide may be not required for the LED.

The light from the lamp 124 is diffused and processed to a plane light source by a total reflection through the light guide plate 126. The light guide plate 126 may include a pattern on a rear surface of the light guide plate 126 to improve uniformity of the light. The pattern of the light guide plate 126 may be one of an elliptical shape, a polygonal shape and a hologram shape. The pattern is formed by a printing method or an injection molding method.

The reflector 122 is disposed at a rear side of the light guide plate 126 and reflects the light to provide the liquid crystal panel 110 such that light brightness is improved. The optical sheet 128 on the light guide plate 126 includes one diffusion sheet and at least one light concentration sheet. The diffusion sheet is disposed directly on the light guide plate 126. The diffusion sheet diffuses the light through the light guide plate 126 and controls light direction such that the light is illuminated to the concentration sheet. The diffused light by the diffusion sheet is concentrated by the light concentration sheet to have a substantially vertical direction related to the liquid crystal display panel 110.

The above backlight unit 120 may be called as a side light type. Namely, the lamp 124 is arranged along one side of the main frame 130. The lamp 124 may be further arranged along any side of the main frame 130.

The liquid crystal panel 110 and the backlight unit 120 are mounted with the main frame 130 using the adhesive tape 140. The main frame 130 has a rectangular frame shape. The main frame 130 includes a horizontal portion 130a and a vertical portion 130b perpendicular to the horizontal portion 130a. The horizontal portion 130a covers rear edges of the backlight unit 120, and the vertical portion 130b covers a side of each of the liquid crystal panel 110 and the backlight unit 120. In other words, the rear edges of the backlight unit 120 are supported by the horizontal portion 130a of the main frame 130, and the sides of the liquid crystal panel 110 and the backlight unit 120 are supported by the vertical portion 130b of the main frame 130. The main frame 130 may be called as a guide panel, a main supporter, or a mold frame. The adhesive tape 140 covers edges of the liquid crystal panel 110 and an opening corresponding to a center of the liquid crystal panel 110 such that images can display through the opening. Edges of the adhesive tape 140 extend along an outer surface of the vertical portion 130b of the main frame 130 such that the liquid crystal panel 110 is mounted with the main frame 130. Namely, the liquid crystal panel 110 and the backlight unit 120 are combined using the main frame 130 that can prevent movement of the liquid crystal panel 110 and the backlight unit 120. In addition, the liquid crystal panel 110 and the main frame 130 are combined using the adhesive tape 140 that can further prevent movement of the liquid crystal panel 110.

Figure 1:
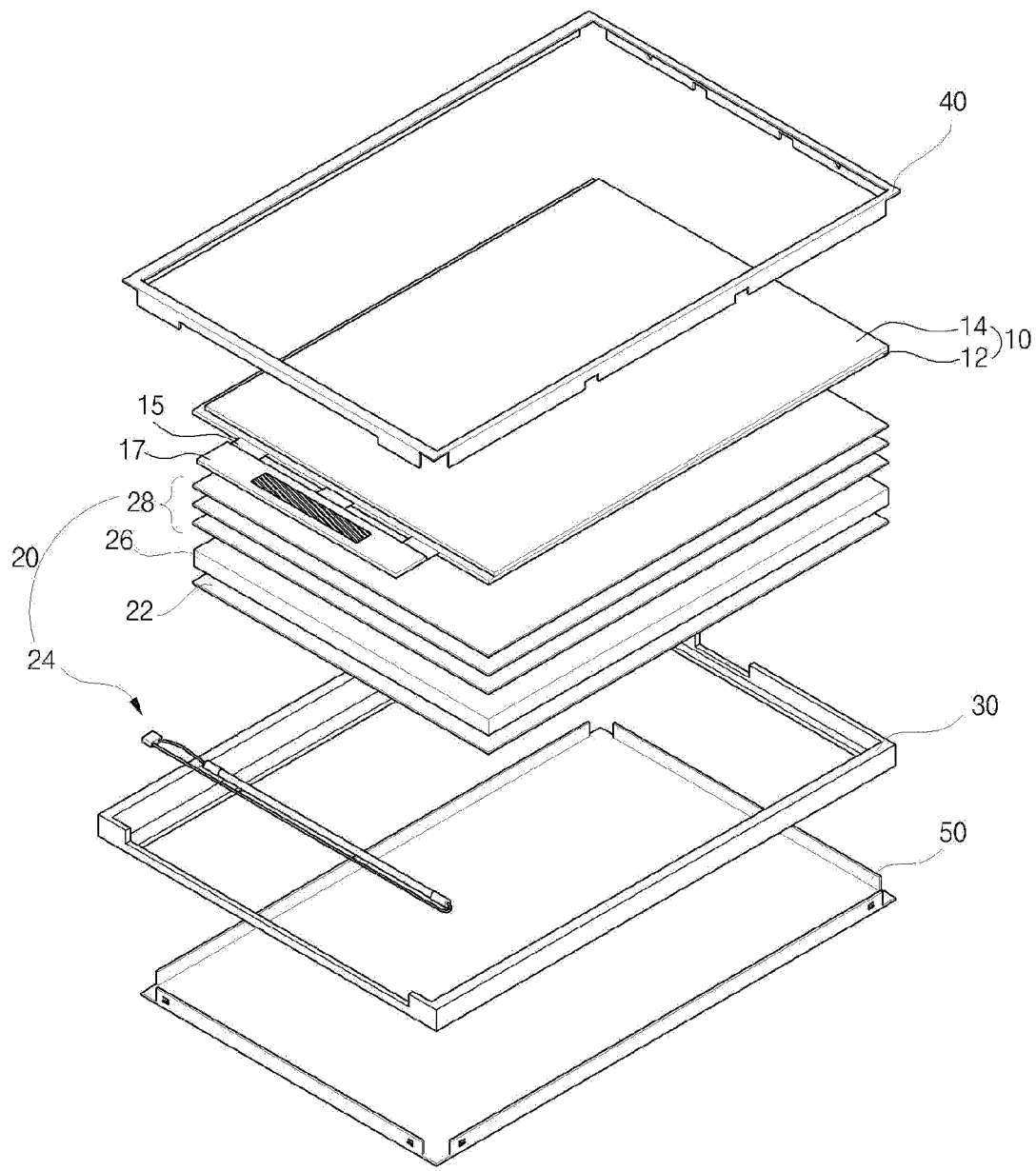
FIG. 1 is a schematic exploded perspective view of the related art LCD device.

In the present invention, since the adhesive tape 140 has a function of the top frame 40 (of FIG. 1) in the related art LCD device and the main frame 130 has a function of the bottom frame 50 (of FIG. 1) in the related art LCD device, the LCD device according to the present invention has a thin profile by eliminating the top and bottom frames. Namely, the LCD device according to the present invention has decreased thickness and width. In addition, the mounting process is simplified. Furthermore, without the top and bottom frame of a metallic material, the LCD device according to the present invention has lighter weight and reduced production costs.

Figure 3:
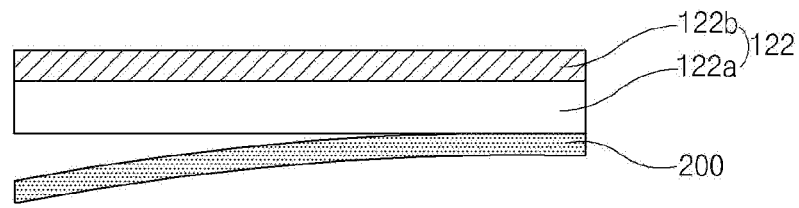
FIG. 3 is a schematic cross-sectional view of a reflector for a LCD device according to the present invention.

A protection sheet 200 is attached on a rear surface of the reflector 122. Since there is no bottom frame in the present invention, the rear surface of the reflector 122 is exposed through an opening of the main frame 130. The protection sheet 200 protects the exposed rear surface of the reflector 122. Referring to FIG. 3, which is a schematic cross-sectional view of a reflector for an LCD device according to the present invention, the reflector with the protection sheet is explained in more detail.

In FIG. 3, the reflector 122 includes a base film 122a and a reflective film 122b on the base film 122a. The base film 122a is formed of a polyethylene-based material, for example, terephthahlic acid, and has good size stability. Silver (Ag), which has a reflectivity of about 90% for visible light, is deposited on the reflective film 122b by a vacuum deposition process or a sputtering process. Alternatively, one of copper (Cu), aluminum (Al), tin (Sn), gold (Au), and a stainless-steel (SUS) may be used for the reflective film 122b. There is no limitation in thickness of the reflective film 122b. For example, the reflective film 122b has a thickness of 50 to 2000 angstroms. It is preferable to have a thickness of 500 to 1000 angstroms. If the reflector 122b has a thickness below 50 angstroms, light reflection is too weak. In addition, since there are many voids on a surface of the reflective film 122b, it is very difficult to obtain a uniform film. On the other hand, if the reflector 122b has a thickness over 2000 angstroms, processing time of deposition or sputtering is increased such that production throughput is decreased. Although not shown, an anchor coat layer may be further formed between the base film 122a and the reflective film 122b to improve their adhesive strength. Alternatively, one of a corona process, a plasma process, a glow discharge process, and a reverse sputter process is processed to one surface of the base film 122a or the reflective film 122b to improve adhesive strength between the base film 122a and the reflective film 122b. For example, the anchor coat layer may be formed of one of polyester resin, alkyd resin being capable of being denaturalized to oil, alkyd resin being capable of denaturalized to urethane, alky resin being capable of being denaturalized to melamine, acrylic resin being capable of being hardened by epoxy, and epoxy-based resin or a their mixture. Alternatively, the anchor coat layer may be formed of an inorganic coating agent, for example, silane as a coupling agent. The anchor coat layer may have a thickness of about 0.01 to 10 micrometers. It is preferable to have about 0.02 to 5 micrometers. If the thickness of the anchor coat layer is below 0.01 micrometer, adhesive strength is too weak. On the other hand, if the thickness of the anchor coat layer is over 10 micrometers, the adhesive strength is no longer improved.

In addition, a top coat layer (not shown) having a thickness of about 1 to 2 micrometers may be formed on the reflective film 122b to prevent oxidization of the reflective film 122b and to maintain the reflectivity. The top coat layer may be formed of acrylic resin including functional additives such as anti-oxidizing agent and ultraviolet shielding agent. The reflector 122 has reflectivity of about 98% and transmissivity of about 2% such that light through the rear surface of the light guide plate 126 (of FIG. 2) is reflected on the reflector 122 to illuminate the liquid crystal panel 110 (of FIG. 2). The above reflector 122 may be called as an enhanced specular reflector.

The protection sheet 200 is attached on the rear surface of the base film 122a of the reflector 122 to protect the reflector 122. Since the bottom frame 50 (of FIG. 1) is eliminated in the LCD device of the present invention and the reflector 122 is exposed through the opening of the main frame 130, the protection sheet 200 prevents for the reflector 122 from being exposed. The protection sheet 200 is removed during an assembling process of the LCD device with a case (not shown) to obtain an LCD device module as an end product. The case may cover a rear surface, side surfaces and edges of a front surface of the liquid crystal display device. Since a dummy sheet attached to the reflector 122 to protect damage to the reflector 122 during the fabricating process of the reflector 122 is used for the protection sheet 200, additional processes or elements for the reflection sheet 200 are not required.

Figure 4:
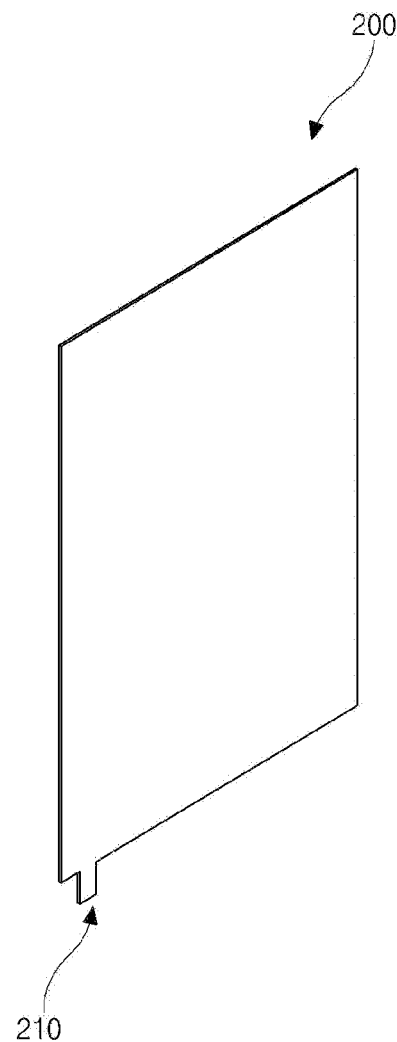
FIG. 4 is a schematic cross-sectional view of a protection sheet for a LCD device according to the present invention.

FIG. 4 is a schematic cross-sectional view of a protection sheet for an LCD device according to the present invention. The protection sheet 200 may be formed of synthetic resin, for example, polyethylene terephthalate (PET), polyethylene or polyamide. The protection sheet 200 has substantially the same shape as the reflector 122. For example, the protection sheet 200 may have a rectangular shape. A protruding part 210 is formed at one side of the protection sheet 200. Generally, the protection sheet 200 is detached from the reflector 122 by hand. It is easier to remove the protection sheet 200 due to the protrusion part 210.

Figure 5A:
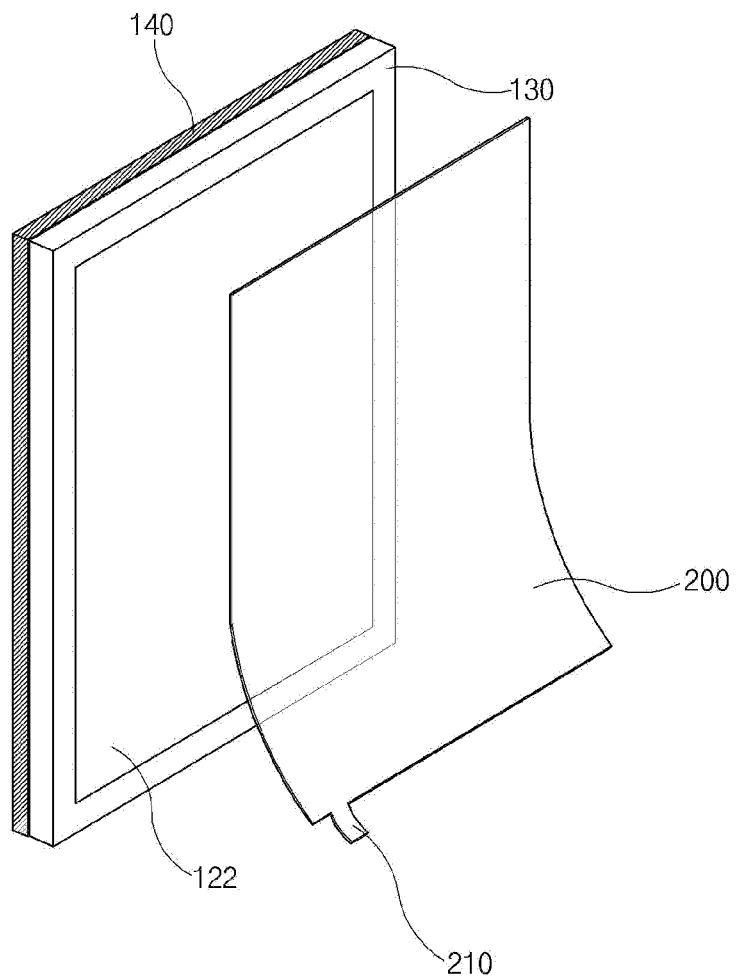
FIGS. 5A and 5B are a schematic view illustrating a figure of detaching a protection sheet from a reflector, respectively.
Figure 5B:
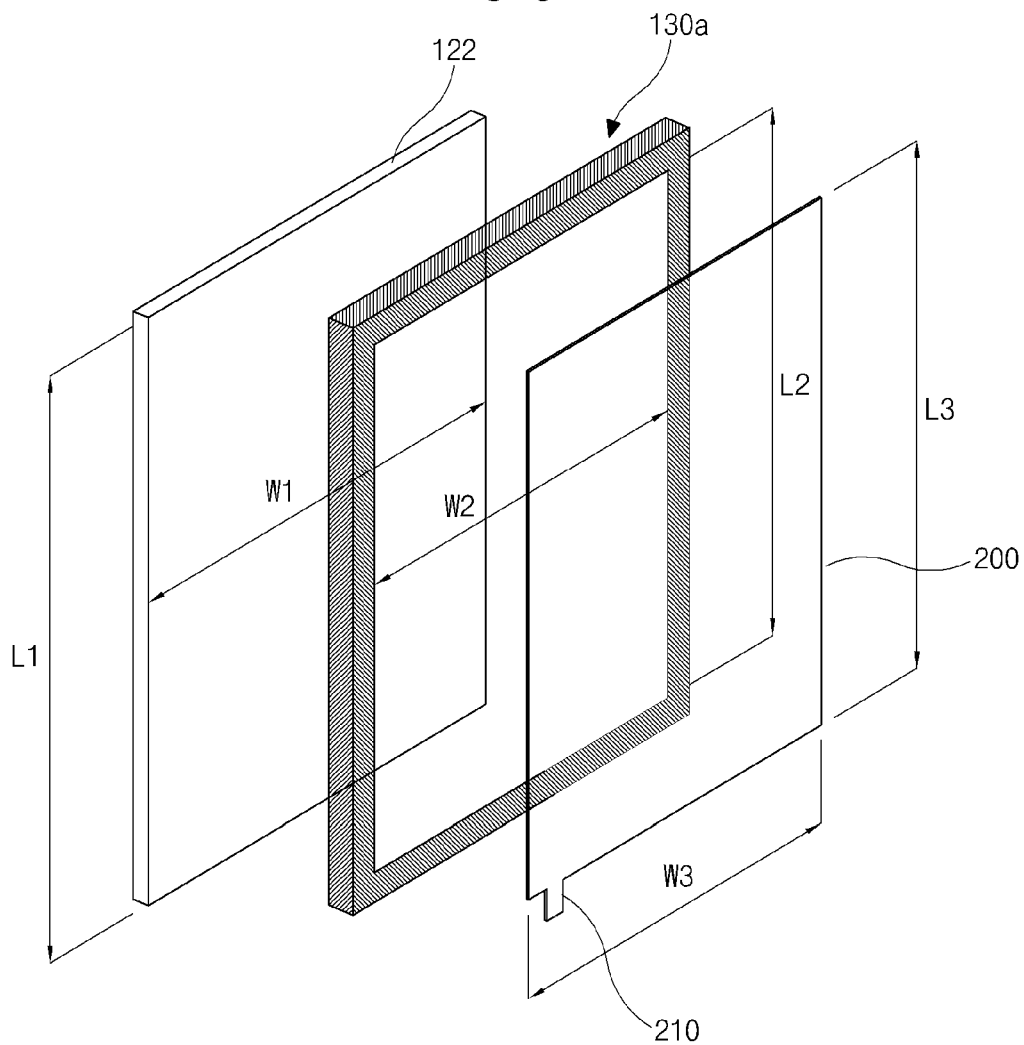

FIGS. 5A and 5B are a schematic view illustrating a figure of detaching a protection sheet from a reflector. In FIGS. 5A and 5B, the liquid crystal panel 110 (of FIG. 2) and the backlight unit 120 (of FIG. 2) are modulated using the main frame 130 and the adhesive tape 140. Since the bottom frame is omitted in the present invention, the rear surface of the reflector 122 as a lowest element of the backlight unit 120 is exposed through the opening of the main frame 130. To protect the exposed rear surface of the reflector 122, the protection sheet 200 is attached to the reflector 122. After a driving circuit (not shown) is connected to the LCD device, the LCD device module as an end product is obtained by combining the LCD device and a case (not shown). The protection sheet 200 should be detached from the reflector 122 before the combining process of the LCD device and the case. The reflective sheet 122 has a first width W1 and a first length L1. Since the main frame 130 covers edges of the reflective sheet 122 and exposes a center of the reflective sheet 122, the opening 130a of the main frame 130 has a second width W2 smaller than the first width W1 and a second length L2 smaller than the first length L1. In addition, since the protection sheet 200 covers the exposed reflective sheet 122 and includes the protruding part 210 for detaching the protection sheet 200, the protection sheet 200 has a third width W3, which is substantially equal to the second width W2, and a third length L3 smaller than the second length L2. The protruding part 210 is not covered with the main frame 130. As mentioned above, the detaching process of the protection sheet 200 is performed by hand. It is easier to detach the protection sheet 200 due to the protrusion part 210.

In the present invention, since the LCD device does not require the top frame and the bottom frame, the LCD device according to the present invention has a thin profile by eliminating the top and bottom frames. In addition, there is no damage to the reflector, which is exposed because the bottom frame is eliminated, due to the protection sheet. Furthermore, it is easier to detach the protection sheet from the reflector due to the protrusion part of the protection sheet.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device module, comprising:
    forming a liquid crystal display device including:
        a liquid crystal panel;
        a main frame surrounding sides of the liquid crystal panel; and
        a backlight unit disposed under the liquid crystal panel and surrounded by the main frame, the backlight unit including a light guide plate, a lamp at a side of the light guide plate, a reflector under the light guide plat; and an optical sheet on the light guide plate, wherein the reflector includes a protection sheet, which has a rectangular shape and includes a protruding part at a side of the rectangular shape, attached to the rear surface of the reflector to protect the rear surface of the reflector, and a rear surface of the protection sheet is exposed through an opening of the main frame;
    detaching the protection sheet from the reflector using the protruding part; and modularizing the liquid crystal display device with a case.

2. The method according to claim 1, wherein the reflective sheet has a first width larger than a second width of the opening of the main frame and a first length larger than a second length of the opening of the main frame, and wherein the rectangular shape of the protection sheet has a third width being substantially equal to the second width and a third length smaller than the second length.

3. The method according to claim 1, wherein the protruding part is disposed in the opening of the main frame.

4. The method according to claim 1, wherein the reflector is an enhanced specular reflector.

5. The method according to claim 1, wherein the liquid crystal display device further includes an adhesive tape covering front edges of the liquid crystal panel and combining with the main frame.

* * * * *